United States Patent [19]

Yamaguchi

[11] Patent Number: 5,041,968
[45] Date of Patent: Aug. 20, 1991

[54] REDUCED INSTRUCTION SET COMPUTER (RISC) TYPE MICROPROCESSOR EXECUTING INSTRUCTION FUNCTIONS INDICATING DATA LOCATION FOR ARITHMETIC OPERATIONS AND RESULT LOCATION

[75] Inventor: Yoshiko Yamaguchi, Tokyo, Japan

[73] Assignee: NEC Corporation, Tokyo, Japan

[21] Appl. No.: 535,300

[22] Filed: Jun. 8, 1990

Related U.S. Application Data

[63] Continuation of Ser. No. 198,310, May 25, 1988, abandoned.

[30] Foreign Application Priority Data

May 26, 1987 [JP] Japan ............... 62-126993

[51] Int. Cl.$^5$ ............... G06F 9/38; G06F 7/00; G06F 13/00
[52] U.S. Cl. ............... 364/200; 364/231.8; 364/232.23; 364/239.4; 364/247; 364/247.2; 364/247.4; 364/247.6; 364/247.8; 364/258; 364/259; 364/260.2; 364/262.4; 364/262.6
[58] Field of Search ... 364/200 MS File, 900 MS File

[56] References Cited

U.S. PATENT DOCUMENTS

| | | | |
|---|---|---|---|
| 4,598,365 | 7/1986 | Boothroyd et al. | 364/200 |
| 4,615,004 | 9/1986 | Chevillat et al. | 364/200 |
| 4,630,195 | 12/1986 | Hester et al. | 364/200 |
| 4,631,672 | 12/1986 | Sakamoto | 364/200 |
| 4,639,866 | 1/1987 | Loo | 364/200 |
| 4,646,236 | 2/1987 | Crockett et al. | 364/200 |
| 4,656,578 | 4/1987 | Chilinski et al. | 364/200 |
| 4,680,701 | 7/1987 | Cochran | 364/200 |
| 4,750,112 | 6/1988 | Jones et al. | 364/200 |
| 4,763,294 | 8/1988 | Fong | 364/200 |
| 4,785,393 | 11/1988 | Chu et al. | 364/200 |
| 4,812,972 | 3/1989 | Chastain et al. | 364/200 |
| 4,841,476 | 6/1989 | Mitchell et al. | 364/900 |
| 4,852,049 | 7/1989 | Sakai | 364/200 |
| 4,873,627 | 10/1989 | Baum et al. | 364/200 |
| 4,873,629 | 10/1989 | Harris et al. | 364/200 |

OTHER PUBLICATIONS

"AM29000" published by Advanced Micro Devices, Inc., Feb. 1987.

Primary Examiner—Joseph A. Popek
Assistant Examiner—George C. Pappas
Attorney, Agent, or Firm—Foley & Lardner

[57] ABSTRACT

A reduced instruction set type microprocessor which reduces loss of central processing unit (CPU) time. A circuit is provided to identify and keep track of whether an arithmetic instruction requires operands contained in internal registers or in main memory. First and second execution stage circuits are provided for executing the first and second instruction executing functions, respectively. The first execution stage circuit performs address calculation if the instruction involves main memory. The second execution stage circuit selects the appropriate operands and performs the arithmetic operation.

3 Claims, 3 Drawing Sheets

REDUCED INSTRUCTION SET COMPUTER (RISC) TYPE MICROPROCESSOR EXECUTING INSTRUCTION FUNCTIONS INDICATING DATA LOCATION FOR ARITHMETIC OPERATIONS AND RESULT LOCATION

This application is a continuation of application Ser. No. 07/198,310, filed May 25, 1988, abandoned.

BACKGROUND OF THE INVENTION

The present invention relates to a reduced instruction set computer type microprocessor.

Microprocessors are broadly classified into reduced instruction set computer (RISC) type and complex instruction set computer (CISC) type microprocessors. For an example of a RISC type microprocessor, reference may be made to "Am 29000" published in February 1987 by Advanced Micro Devices, Inc.

A RISC type microprocessor has a set of simple instructions for the sake of hardware simplification and can perform the processing of each stage of an instruction within one clock cycle by processing each instruction under pipeline control of hardware.

By contrast, a CISC type microprocessor, having a set of functionally complex instructions, which are executed under microprogram control, results in the fact that most of the instructions require a plurality of clock cycles to be executed. A set of functionally complex instructions can be divided into sets of simple instructions for use by a RISC type microprocessor. Therefore, a high-level language program is reformed by a compiler into groups of simple instructions, each optimized for an individual program. As a result, a RISC type microprocessor permits hardware simplification and performance improvement compared with a CISC type microprocessor.

To simplify the functions of instructions, a RISC type processor uses the following load/store formula. Where instructions to process memory data are concerned, this load/store formula consists only of a load instruction for reading the data of a memory out to an internal register and a store instruction for storing the data of the internal register into the memory.

In a microprocessor using such a RISC type load/store formula, arithmetic operation of data in the internal register with data from the memory, and storing the results the arithmetic operation into the internal register, require two steps, a load instruction and an instruction for arithmetic operation between registers.

In a pipeline-controlled microprocessor, if there is no executable instruction in any of the stages of logical address formation, conversion from a logical to a physical address and memory access results in a loss of CPU time. Instruction for arithmetic operation between data from an internal register and data from a memory is a frequently used instruction. Accordingly, there is a disadvantage that the efficiency of memory use in the performance aspect is prevented from improvement by the loss of CPU time and by the high frequency of instruction use.

In a CISC type microprocessor, no effective instruction can be interposed between a load instruction and an arithmetic instruction, and, accordingly, a longer time is required for the execution of instructions. To avoid this disadvantage, there is conceivable a structure to permit parallel operation of the address generating section and the arithmetic executing section. This structure, however, entails separate control of the address generating section and the arithmetic executing section, inviting greater complexity of both control and hardware composition.

SUMMARY OF THE INVENTION

An object of the present invention is, therefore, to provide a RISC type microprocessor free from the above-mentioned disadvantages and capable of executing an instruction, which would otherwise require two steps, by a single step.

Another object of the invention is to provide a RISC type microprocessor intended to reduce the loss of CPU time in memory accessing and to prevent increased complexity of hardware.

According to one aspect of the invention, there is provided a RISC type microprocessor for pipeline processing comprising:

an instruction fetch stage for fetching an instruction, having within itself a first instruction executing function and a second instruction executing function;

first execution stage for executing the first instruction executing function of the instruction from the instruction fetch stage means; and a second execution stage for executing the second instruction, executing function of said instruction under pipeline control, following the completion of execution by the first execution stage.

BRIEF DESCRIPTION OF THE ACCOMPANYING DRAWINGS

The features and advantages of the present invention will become apparent from the following detailed description when taken in conjunction with the accompanying drawings in which.

In the drawings, the same reference numerals denote the same or corresponding structural elements.

DETAILED DESCRIPTION OF THE PREFERRED EMBODIMENT

Figure 3:
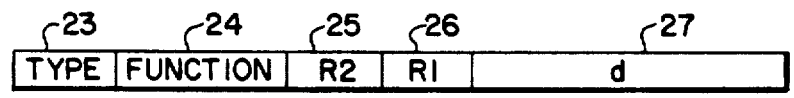
FIG. 3 is a diagram illustrating the form of the instructions used in the embodiment of the invention.
Figure 4:
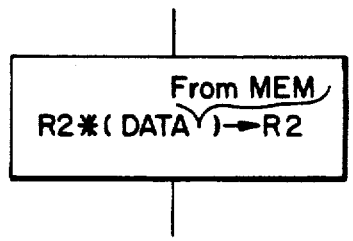
FIG. 4 is a flow chart showing how the instructions illustrated in FIG. 3 are executed.

Referring to FIG. 3, instructions applicable to a preferred embodiment of the present invention are two kinds of instructions. The first kind of instruction, known as the register*register type, has functions to take in data to be put to arithmetic operation from a storage unit consisting of a group of registers or a random access memory (RAM), subject them to arithmetic operation, and return the result of the operation to the storage unit. The second kind of instruction, known as the register*memory type, has functions to take in one of the data to be put to arithmetic operation from the storage unit and the other from a memory consisting of a cache memory or a main memory, subject them to arithmetic operation, and return the result of the operation to the storage unit. Thus the symbol, "*", is used herein to indicate obtaining data from the stated locations, performing an operation and transferring the result to a succeeding location.

Therefore, an instruction applicable to the embodiment has an instruction type stating section 23 for identifying the instruction to be the register*register type or the register*memory type; an instruction function stating section 24 for indicating a first instruction executing function or a second instruction executing function according to the content of the instruction type stating section 23; an R2 section 25 for indicating the operand of one of the data to be put to arithmetic operation and where the result of the operation should be stored; an R1 section 26 which functions as an address for reading out the source address in a register*memory type instruction, or as the operand of the other of the data in a register* register type instruction; and a displacement d section 27.

Figure 1:
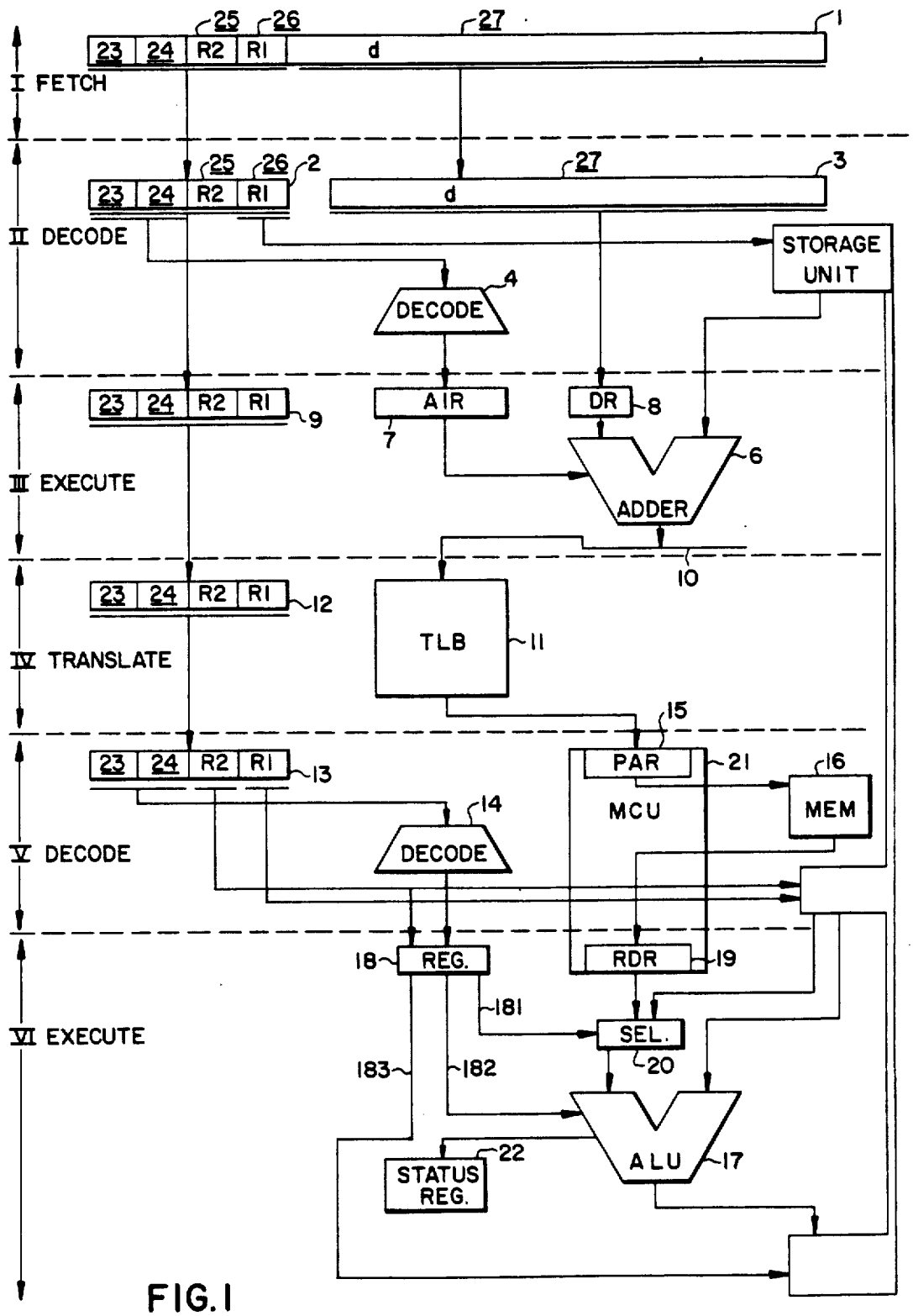
FIG. 1 is a diagram of one preferred embodiment of the invention.

Referring now to FIG. 1, an embodiment of the invention operates under six stages, I to VI, of pipeline control. The first stage of this pipeline, i.e. the instruction fetch stage I, is provided with an instruction register 1 to store instructions of the composition shown in FIG. 3. The second stage of the pipeline, i.e., the first instruction executing function decoding stage II, has a displacement register 3 for storing a displacement d, which is one of the two segments into which the contents of the instruction register are divided; an instruction register 2 for storing contents other than the displacement d, which is the other of the two segments into which the contents of the instruction register are divided; a first decoder (DECODE) 4 for decoding the contents of the instruction type stating section 23 and the instruction function stating section 24 from the instruction register 2; and a storage unit 5 consisting of a group of registers or a random access memory (RAM) responsive to the contents of the R1 section from the instruction register 2 for reading out the base address if the instruction is the register*memory type or the stored contents if it is the register*register type.

In the third stage of the pipeline, i.e., the first instruction executing function executing stage III, address calculation is done by an adder 6 if the instruction is the register*memory type. In the stage III, for this address calculation, there are provided an addition instruction register (AIR) 7 for storing an addition instruction signal, which is the result of decoding from the first decoder 4; a register (DR) 8 for storing the displacement d, which is to be added by the adder 6; and an instruction register 9 for storing all the contents given from the instruction register 2. The registers 7, 8 and 9 are also used for timing adjustment.

In the fourth stage of the pipeline, i.e. the translating stage IV, an address translate lookaside buffer (TLB) 11 translates a logical address, fed from the adder 6 via a common bus 10, into a physical address. This stage IV is also provided with an instruction register 12 for storing the contents given from the instruction register 9.

The fifth stage of the pipeline, i.e., the second instruction executing function decoding stage V, is provided with an instruction register 13 for storing the contents of the instruction register 12; a second decoder (DECODE) 14 for decoding the contents of the instruction type stating section 23 and the instruction function stating section 24 from the instruction register 13; the storage unit 5, responsive to the operands R1 and R2 from the instruction register 13, for reading out data; a physical address register (PAR) 15 for storing the physical address resulting from the address translation by the TLB 11 if the instruction is the register*memory (MEM) type; and memory 16, corresponding to a cache memory or a main memory, responsive to the physical address from the physical address register 15 for reading out data.

In the sixth stage of the pipeline, i.e. the second instruction executing function executing stage VI, arithmetic operation of data is accomplished by an arithmetic and logical unit (ALU) 17. This stage VI is provided with a register (REG) 18 for storing the result of decoding from the second decoder 14 and the operand R2 from the register (RDR) 13; a readout data register 19 for storing data from the memory 16; a selector (SEL) 20 for selecting data from the readout data register 19 or storage unit 5 in response to a selection instructing signal supplied from the register 18 via a line 181; the ALU 17 for performing arithmetic operation of the data selected by the selector 20 and the storage unit 5 in response to an arithmetic operation instructing signal given from the register 18 via a line 182; a status register (STATUS REG) 22 for storing status information from the ALU 17; and the storage unit 5 for storing the result of arithmetic operation from the ALU 17 in a position indicated by the operand R2 supplied via a line 183.

The physical address register 15 and the readout data register 19 may be included in a memory control unit (MCU) 21.

Next is a detailed description of the operation of the preferred embodiment of the present invention with reference to accompanying drawings.

First will be explained the instructions which the following description of the operation presupposes. Out of the four instructions 1 to 4 used in this description, the instructions 1, 3 and 4 are register*memory type instructions involving accesses to the memory. The instruction 2 is a register*register instruction involving no access to the memory but only demanding an access to the storage unit 5.

Figure 2:
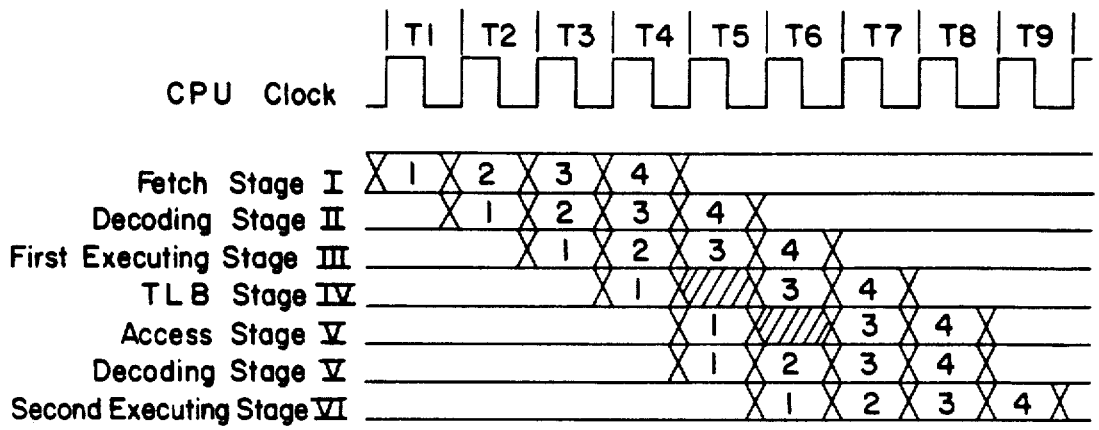
FIG. 2 is a diagram for explaining the operation of the embodiment of the invention.

Referring to FIGS. 1 and 2, in a machine cycle T1 defined by a CPU clock, the instruction 1 is fetched by the instruction register 1.

In the next machine cycle T2, the contents of the stating sections 23 and 24 of the instruction 1 are decoded by the first decoder 4, the base address is read out as designated by R1 of the instruction 1, and the displacement d of the instruction 1 is fetched by the register 3. In this cycle T2, the instruction 2 is stored in the instruction register 1.

In a machine cycle T3, the instruction 1 causes address calculation to be done, using the displacement d and the base address, by the adder 6 in the stage III, and a logical address is generated. The instruction 2, which is in stage II, causes the first decoder 4 to decode the contents of its stating sections 23 and 24. This decoding reveals that the register*register type instruction 2 is a no-operation (NOP) instruction. Therefore, the contents read out of storage unit 5 in accordance with R1 of the instruction register 2 are not added by the adder 6 of the stage III. Meanwhile, the instruction 3 is stored in the instruction register 1 in the stage I.

In a machine cycle T4, the instruction 1 causes the logical address, resulting from addition by the adder 6, to be translated into a physical address by TLB 11 in stage IV. Regarding instruction 2, the result of decoding (indicating no operation) is stored in the register 7, and fed to the adder 6 in stage III. The displacement d is also stored in the register 8. The adder 6, having accepted this displacement d from the register 8 and the contents from the storage means 5, performs no addition in response to the result of decoding from the register 7.

In stage 3, instruction 3 causes decoding of the stating sections 23 and 24, and readout of the base address to storage unit 5. The instruction 4 is stored in the instruction register 1 in stage I.

In a machine cycle T5, the instruction 1 is placed in stage V, where the memory is accessed and decoded data are taken out. In the memory accessing operation, the physical address, having undergone address translation by TLB 11, is stored in the physical address register 15. In response to the physical address from this register 15, data are read out of the memory means 16. In the operation to take out decoded data, first the contents of the stating sections 23 and 24 are decoded by the second decoder 14, to which R2 is given as the destination where the result of an arithmetic operation on the data is to be stored. Then R2 and R1 are fed to the storage unit 5 as operands for use in taking out the data to undergo arithmetic operation, and the data are taken out of the storage unit 5. The instruction 2 is stored in the register 12 of stage IV. Since no address calculation took place in preceding stage III for the instruction 2, address translation is not done in the stage IV. As instruction 3 is a register*memory type instruction like the instruction 1, address calculation does take place in its stage III. The instruction 4 causes decoding and base address extraction to be done in its stage II.

In a machine cycle T6, the instruction 1 causes arithmetic operation of data to be executed in stage VI. Thus, in response to the selection instructing signal given from the register 18, in which the result of decoding is stored, via the line 181, the selector 20 selects the data supplied from the readout data register 19. In response to the arithmetic operation designating signal given from the register 18 via the line 182, the ALU 17 subjects to arithmetic operation the data from the selector 20 and the storage unit 5. The result of arithmetic operation is stored in a position in the storage unit 5 indicated by an address supplied from the register 18 via the line 183. The status information from the ALU 17 is stored in the register 22. The instruction 2 is stored in the instruction register 13 in the stage V. In the TLB 11, as no address translation has taken place, memory 16 is not accessed. Therefore, data are taken out of the storage unit 5 in response to the operands R1 and R2 supplied from the instruction register 13. The second decoder 14 decodes the contents of the stating sections 23 and 24 of the register 13. The instruction 3 undergoes address translation in stage IV, and the instruction 4, undergoes address calculation in stage III.

In a machine cycle T7, data are put to arithmetic operation under the instruction 2 in stage VI. Thus, the selector 20 selects data from the storage unit 5 in response to the selection instruction signal given from the register 18 via the line 181. The ALU 17 subjects to arithmetic operation two data supplied from the storage unit 5, in response to the operation instructing signal given from the register 18 via the line 182, and stores the result of the operation in the storage unit 5. In stage V, the memory is accessed and decoded data is taken out under the instruction 3. In stage IV address translation takes place under the instruction 4.

In a machine cycle T8, data are put to arithmetic operation under the instruction 3 in stage VI, and in stage V, the memory is accessed and decoded data are taken out under the instruction 4.

In a machine cycle T9, data are put to arithmetic operation under the instruction 4 in stage VI.

To explain the advantage of the present invention, the operation will be further described below with reference to instructions having the same functions as those used in the foregoing preferred embodiment.

In a processor of the prior art using load/store architecture, where data from an internal register and data from a memory are to be put to arithmetic operation and the operation result is to be stored in the internal register, there are required at least two steps, the load instruction and the instruction for arithmetic operation between registers.

Figure 5:
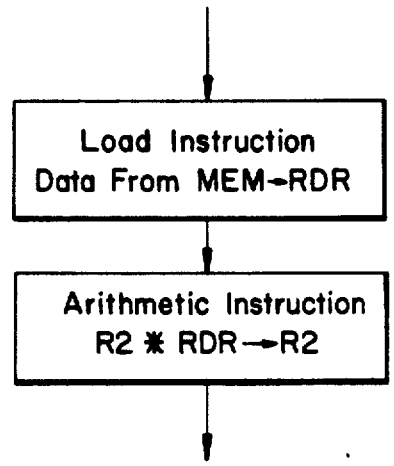
FIGS. 5 and 6 are diagrams for describing the advantages of the invention.

Referring to FIG. 5, the load instruction of the first step causes memory address calculation and memory data loading to be done.

[R1 (register)+displacement]→RDR (readout data register)

Thus the base address from the register denoted by R1 and the displacement are added together, and the resultant logical address is translated into a physical address. Then data are read out of the memory means are stored in the readout data register RDR.

The instruction for the arithmetic operation of the second step causes arithmetic operation of data from the register and from the memory to take place.

R2 (register)*RDR→R2

Thus the data from the register denoted by R2 and the data from the data register RDR, into which the data were stored at the first step, are subjected to arithmetic operation, and the result of the operation is stored in the register denoted by R2.

Figure 6:
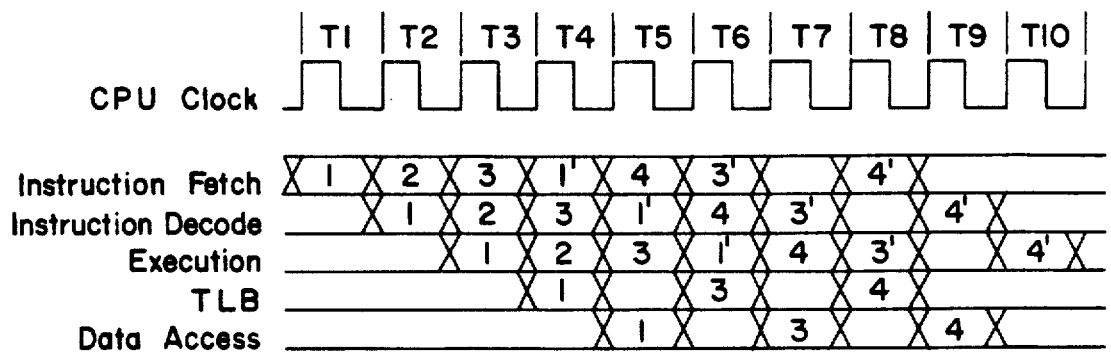

Referring now to FIG. 6, numerals 1 to 4 and 1', 3' and 4' are reference numbers of instructions. The instructions 1, 3 and 4 are load instructions of the aforementioned first step, and the instructions 1', 3' and 4', are instructions for arithmetic operation of the aforementioned second step.

The instruction 2, like the instruction 2 referred to in connection with the preferred embodiment, is a register*register type instruction.

Under the instruction 1: the instruction is fetched in machine cycle T1; the instruction is decoded in cycle T2; address calculation takes place in cycle T3; address translation is done in cycle T4; and data are accessed and taken out in cycle T5. Since, therefore, the data taken out in machine cycle T5 are used in the arithmetic operation of data under the instruction 1', the executing stage of arithmetic operation under the instruction 1' should not be before the machine cycle T6. Accordingly, unless two effective instructions can be placed between the instructions 1 and 1', CPU time will be correspondingly lost.

Under the instruction 4 for instance, data are taken out in machine cycle T9, so that the execution of the instruction 4' should not be earlier than machine cycle T10. Since, therefore, no effective instruction can be placed between the instructions 3' and 4', 10 machine cycles are needed from the time data are taken out under the instruction 1 until the completion of execution of the instruction 4', resulting in the loss of CPU time corresponding to one machine cycle.

Referring back to FIG. 2, an instruction which would have previously required two steps can now be executed in one step. Thus the present invention makes it possible for a single instruction to have both a first instruction executing function and a second instruction executing function, thereby permitting parallel operation under pipeline control, and makes it possible to read out this instruction from an external memory unit to execute address generation, which is the first instruction executing function. Then the invention executes arithmetic operation, which is the second executing function, under pipeline control.

As a result, the invention makes it possible to halve the number of steps of instructions entailing data accessing, such as instructions for arithmetic operation between internal register and memory data, which are frequently used in a program. The invention can further help to substantially reduce the losses of CPU time in address generation and memory accessing. Further, because of the absence of lost time in address translation, the invention makes it possible to avoid the trouble of having to insert the instructions 2 and 3 of FIG. 6 for effective utilization of the time which would otherwise be lost.

What is claimed is:

1. A microprocessor controlled under pipeline control, comprising:
   first storage means for storing first data and second data;
   second storage means for storing third data;
   arithmetic/logic means, having a first input and a second input, for performing a predetermined operation using data from said first and second inputs;
   means for supplying said first data from said first storage means to said first input;
   means for selectively supplying said second data from said first storage means or said third data from said second storage means to said second input;
   address calculating means for calculating an address of said third data in said second storage means;
   an instruction register holding an operating instruction including,
   a first field for selectively holding a first type of instruction or a second type of instruction,
   said first type of instruction indicating that said arithmetic means is to perform said predetermined operation using said first data and said second data from said first storage means,
   said second type of instruction indicating that said arithmetic unit is to perform said predetermined operation using said first data from said first storage means and said third data from said second storage means,
   a second field for selectively holding a third type of instruction when said first field holds said first type of instruction or a fourth type of instruction when said first field holds said second type of instruction,
   said third type of instruction indicating that said address calculating means is to perform no address calculating operation when said first type of instruction indicates that said arithmetic means is to use said first data and said second data from said internal register means,
   said fourth type of instruction indicating that said address calculating means is to perform an address calculating operation when said second type of instruction indicates that said arithmetic means is to use said first data from said first storage means and said third data from said second storage means;
   pipeline control means for transferring said operating instruction from said instruction register to a first successive register;
   said address calculating means responding to said fourth type of instruction in said first successive register for calculating said address of said third data;
   means for accessing said third data in said second storage means on the basis of said address to provide said third data to said means for selectively supplying;
   said pipeline control means transferring said operating instruction from said first successive register to a second successive register; and
   means for responding to said first field in said operating instruction in said second successive register to control said means for selectively supplying.

2. A microprocessor controlled under pipeline control, comprising:
   instruction register means for storing an instruction, said instruction including an instruction type portion and an instruction function portion, said instruction type portion being, respectively, of a first type indicated by a first designation and of a second type indicated by a second designation and said instruction function portion having, respectively, a first content corresponding to said first designation and a second content corresponding to said second designation;
   instruction fetch means for fetching said instruction from said instruction register means;
   first execution means for receiving said instruction from said instruction fetch means and for executing a first instruction executing function, said first execution means including
   means for calculating an address of an operand in a storage means in response to said instruction and
   means for, respectively, enabling said means for calculating in response to said first designation and content and for disabling said means for calculating in response to said second designation and content;
   pipeline controlled means for transferring said instruction type portion and said instruction function portion of said instruction from said instruction register means to a further instruction register means following completion of execution by said first execution means; and
   second execution means for responding to said instruction type portion and said instruction function portion from said further instruction register means and for executing arithmetic/logical operations for data depending, respectively, upon one of said first designation and said second designation of said instruction type portion and a corresponding one of said first content and said second content of said instruction function portion being held in said further instruction register;
   said data including said operand upon said first designation being held in said further instruction register.

3. A microprocessor as set forth in claim 2, wherein:
   said instruction fetch means comprises
   first storing means for storing said instruction and
   decoding means for decoding said instruction to determine an existence of said first content or said second content in said instruction;
   said means for calculating comprises address calculation means for calculating said address of said operand when said instruction specifies an operand located in a main memory as said storage means; and
   said second execution means comprises an arithmetic and logical unit for executing said arithmetic/logical operations.

* * * * *